United States Patent
Sartori et al.

(10) Patent No.: US 11,564,193 B2
(45) Date of Patent: Jan. 24, 2023

(54) AUTHENTICATION IN PUBLIC LAND MOBILE NETWORKS COMPRISING TENANT SLICES

(71) Applicant: Nokia Technologies Oy, Espoo (FI)

(72) Inventors: Cinzia Sartori, Pullach (DE); Anja Jerichow, Grafing bei München (DE); Peter Schneider, Holzkirchen (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 82 days.

(21) Appl. No.: 17/055,119

(22) PCT Filed: May 18, 2018

(86) PCT No.: PCT/FI2018/050376
§ 371 (c)(1),
(2) Date: Nov. 12, 2020

(87) PCT Pub. No.: WO2019/220002
PCT Pub. Date: Nov. 21, 2019

(65) Prior Publication Data
US 2021/0219256 A1    Jul. 15, 2021

(51) Int. Cl.
*H04W 60/00*    (2009.01)
*H04W 12/06*    (2021.01)

(52) U.S. Cl.
CPC .......... *H04W 60/00* (2013.01); *H04W 12/06* (2013.01)

(58) Field of Classification Search
CPC ..... H04W 60/00; H04W 12/06; H04W 24/02; H04W 60/04; H04W 48/18
See application file for complete search history.

(56) References Cited

U.S. PATENT DOCUMENTS

| 2017/0303259 A1 | 10/2017 | Lee et al. | |
| 2019/0335392 A1* | 10/2019 | Qiao | H04W 80/02 |
| 2021/0112513 A1* | 4/2021 | Chun | H04W 48/18 |

FOREIGN PATENT DOCUMENTS

| WO | 2018/008980 A1 | 1/2018 |
| WO | 2018/013925 A1 | 1/2018 |

(Continued)

OTHER PUBLICATIONS

Peter Schneider et al., Providing Strong 5G Mobile Network Slice Isolation for Highly Sensitive Third-Party Services, 2018, 2018 IEEE Wireless Communications and Networking Conference (WCNC), pp. 1-3 (Year: 2018).*

(Continued)

*Primary Examiner* — Brandon J Miller
(74) *Attorney, Agent, or Firm* — Squire Patton Boggs (US) LLP (57) ABSTRACT

Authentication in a public land mobile network, PLMN, having tenant slices is performed by a network element that has: a memory comprising program code; a communication circuitry for communication with entities in the PLMN; and a processing circuitry configured to execute the program code and according to the program code to cause: detecting a registration request from a mobile communication device, MCDt; detecting whether the registration request requests access to a network slice with one-tier authentication with the network slice, and: if yes, causing beginning of authenticating the MCDt with the network slice independently of any authentication between the MCDt and the PLMN.

20 Claims, 4 Drawing Sheets

(56) References Cited

FOREIGN PATENT DOCUMENTS

| WO | 2018/038489 A1 | 3/2018 |
| WO | 2018/077232 A1 | 5/2018 |
| WO | 2018/077960 A1 | 5/2018 |
| WO | 2018/079690 A1 | 5/2018 |

OTHER PUBLICATIONS

"3rd Generation Partnership Project; Technical Specification Group Services and System Aspects;Security architecture and procedures for 5G system(Release 15)", 3GPP TS 33.501, V15.0.0, Mar. 2018, pp. 1-128.

"3rd Generation Partnership Project; Technical Specification Group Services and System Aspects; System Architecture for the 5G System; Stage 2 (Release 15)", 3GPP TS 23.501, V15.1.0, Mar. 2018, pp. 1-201.

"3rd Generation Partnership Project; Technical Specification Group Services and System Aspects; Procedures for the 5G System;Stage 2 (Release 15)", 3GPP TS 23.502, V15.1.0, Mar. 2018, pp. 1-285.

"3rd Generation Partnership Project; Technical Specification Group Services and System Aspects; Study on the security aspects of the next generation system (Release 14)", 3GPP TR 33.899, V1.3.0, Aug. 2017, 605 pages.

"What is Network Slicing?", 5G.co.uk, Retrieved on Nov. 10, 2020, Webpage available at : https://5g.co.uk/guides/what-is-network-slicing/.

International Search Report and Written Opinion received for corresponding Patent Cooperation Treaty Application No. PCT/FI2018/050376, dated Aug. 31, 2018, 17 pages.

\* cited by examiner

AUTHENTICATION IN PUBLIC LAND MOBILE NETWORKS COMPRISING TENANT SLICES

RELATED APPLICATION

This application claims priority to PCT Application No. PCT/FI2018/050376, filed on May 18, 2018, which is incorporated herein by reference in its entirety.

TECHNICAL FIELD

The present application generally relates to authentication in public land mobile networks comprising tenant slices. In particular, though not exclusively, the present application relates to authentication in 5G networks comprising tenant slices.

BACKGROUND

This section illustrates useful background information without admission of any technique described herein representative of the state of the art.

Public Land Mobile Networks (PLMN) have greatly evolved during past decades from rudimentary voice communication enablers to mobile broadband Internet devices. Currently, a fifth generation of mobile networks is being designed e.g. by further developing the Long-Term Evolution (LTE). 5G networks also support wireless LAN (WLAN or IEEE 802.11) radio access.

Network slicing enables efficient sharing of network resources so that different users or types of uses employ the network resources with different requirements, such as Quality of Service.

In order to use a network slice produced by network slicing, a mobile device is first authenticated (primary authentication) based on a subscriber database of the PLMN. Depending on the subscription details and policies of the PLMN, the mobile is by this implicitly authorized to use certain resources in the PLMN. Typically, these resources support a connection to a data network (outside the PLMN), which could be the Internet, or, for example, a private data network of some third party company. A secondary authentication may be required by the data network, based on an own user data base in the data network. In case of a private data network, the secondary authentication is typically needed.

The third party is referred to as tenant, when it has rented resources of the PLMN, for example in form of a network slice. E.g., the PLMN operator creates a slice inside the PLMN for the third party, and the connections between the tenant's mobile devices and the data network use the resources of this slice. Then the third party is a tenant of the PLMN operator. Each time a tenant's mobile device attaches to the PLMN and is successfully authenticated using primary authentication, the PLMN authorizes it to use the tenant's slice to connect to the tenant's data network, but real access to the data network may only be granted by the tenant after successful secondary authentication.

SUMMARY

Various aspects of examples of the invention are set out in the claims.

According to a first example aspect of the present invention, there is provided a mobile communication device comprising:

a memory comprising mobile communication device credentials specific to a network slice;
a radio communication circuitry for wirelessly communication; and
a processing circuitry configured to:
detect using the radio communication circuitry an available public land mobile network that provides access to the network slice;
form, based on the mobile communication device credentials, a registration request for one-tier authentication with the network slice independently of any authentication between the mobile communication device and the public land mobile network; and
send, using the radio communication circuitry, the registration request to the available public land mobile network.

The one-tier authentication with the network slice may be performed independently of any authentication with the public land mobile network so that the mobile communication device can gain access to the network slice with only one authentication process. No public land mobile network attach related authentication may be needed.

The available public land mobile network may comprise a base station. The base station may be a 5G base station or gNB. The base station may support wireless local area network, WLAN, compliant radio communications. The WLAN radio communications may comply with IEEE 802.11 standard, any version thereof (such as b, a, n, g, etc.). The base station may be a non-3GPP base station. The base station may be configured to use N3IWF to hide details on non-3GPP access to the 3GPP network.

The radio communication circuitry may be configured to perform IEEE 802.11b compliant communications. The radio communication circuitry may be capable of accessing the available public land mobile only with IEEE 802.11b compliant communications. The radio communication circuitry may be capable of performing cellular communications. The radio communication circuitry may support at least one of: GSM; GPRS; UMTS; LTE; 5G.

Compliance with IEEE 802.11b may be used in sake of universality without intention to restrict using more recent versions of IEEE 802.11 such as IEEE 802.11n or IEEE 802.11g.

The registration request may be a radio resource control connection setup message. The registration request may be sent independent of performing any cellular network registration.

The registration request may comprise an indication of a given network slice to which registration is requested. The registration request may comprise Network Slice Selection Assistance Information. The Network Slice Selection Assistance Information (NSSAI) may comprise at least one Single Network Slice Selection Assistance Information (S-NSSAI), the S-NSSAI comprising a Slice/Service Type (S-NSSAI-SST) and optionally a Slice Differentiator (S-NSSAI-SD) that allows differentiating between multiple network slices of the same Service Type.

The mobile communication device may be configured to support EAP. The mobile communication device may be configured to support EAP-TLS. The mobile communication device may be configured to support EAP, EAP-TLS or any tenant configured authentication method directly with the network slice.

The mobile communication device may be configured to support 5G AKA. The mobile communication device may be configured to support 5G AKA directly with the network slice.

The mobile communication device may be configured to support EAP-AKA'. The mobile communication device may be configured to support EAP-AKA' directly with the network slice.

The mobile communication device may be configured to support any other EAP method or other tenant configured authentication method. The mobile communication device may be configured to support any other EAP method or any tenant configured authentication method directly with the network slice.

The mobile communication device may be an Internet-of-Things device. The mobile communication device may have no user interface. The mobile communication device may be configured to operate under control of one or more machines. The mobile communication device may be configured to operate solely under control of one or more machines.

The mobile communication device may be configured to receive a registration response from the available public land mobile network. The registration response may comprise information identifying allowed one or more network slices. The registration response may comprise a 5G Globally Unique Temporary Identity (5G-GUTI). The registration response may comprise a registration area indication. The registration response may comprise one or more mobility restrictions.

The mobile communication device may be a mobile device. Alternatively, the mobile communication device may be a fixed device.

According to a second example aspect of the present invention, there is provided a method in a mobile communication device comprising:

maintaining mobile communication device credentials specific to a network slice;

detecting from radio communication an available public land mobile network that provides access to the network slice;

forming, based on the mobile communication device credentials, a registration request for requesting access to the network slice; and sending, using radio communication, the registration request to the available public land mobile network.

According to a third example aspect of the present invention, there is provided a network element for a public land mobile network, comprising:

a memory comprising program code;

a communication circuitry for communication with entities in the public land mobile network; and a processing circuitry configured to execute the program code and according to the program code to cause:

detecting a registration request from a mobile communication device;

detecting whether the registration request requests access to a network slice with one-tier authentication with the network slice, and:

if yes, causing beginning of authenticating the mobile communication device with the network slice independently of any authentication between the mobile communication device and the public land mobile network.

According to a fourth example aspect of the present invention, there is provided a method in network element of a public land mobile network, comprising:

detecting a registration request from a mobile communication device;

detecting whether the registration request requests access to a network slice with one-tier authentication with the network slice, and:

if yes, causing beginning of authenticating the mobile communication device with the network slice independently of any authentication between the mobile communication device and the public land mobile network.

If the registration request does not request access to the network slice with one-tier authentication with the network slice, attempting to perform network attach with the mobile communication device. The network attach may be based on resources of a subscriber identity module of the mobile communication device. The subscriber identity module may be a universal subscriber identity module.

The network element may be an authentication server function.

The network element may be a core access and mobility management function.

The network element may be a security anchor function.

The causing of the beginning of authenticating the mobile communication device with the network slice may comprise obtaining an authentication vector for the mobile communication device from a tenant authentication entity of the network slice based on the registration request.

The public land mobile network may be a 5G public land mobile network.

According to a fifth example aspect of the present invention, there is provided a computer program comprising computer executable program code configured to cause a mobile communication device to execute the method of the second example aspect.

According to a sixth example aspect of the present invention, there is provided a computer program comprising computer executable program code configured to cause a network element to execute the method of the fourth example aspect.

According to seventh example aspect of the present invention, there is provided a program product comprising the computer program of the fifth or sixth example aspect.

The computer program of any example aspect may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device. The memory medium may be a non-transitory memory medium.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well. For example, the underlying method steps implicitly disclosed by apparatus related aspects and embodiments may be applied as part of various methods of this document as well and vice versa, method steps may be implemented by apparatuses disclosed by this document.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 7 of the drawings. In this document, like reference signs denote like parts or steps.

Figure 1:
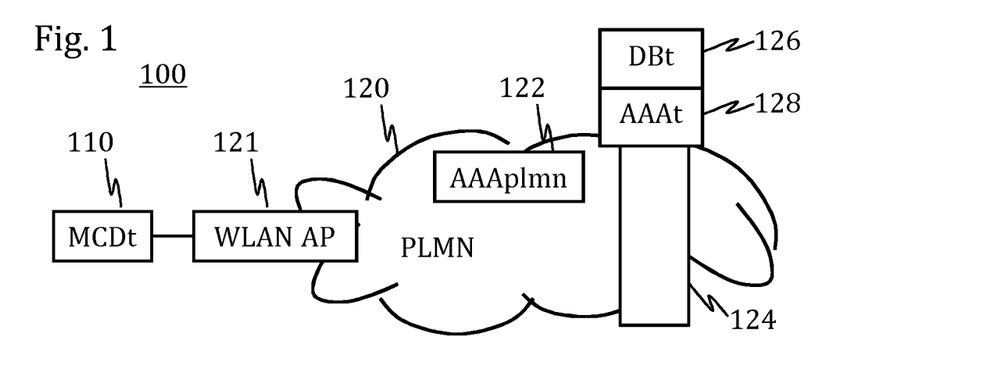
FIG. 1 shows an architectural drawing of a system of an example embodiment.

FIG. 1 shows an architectural drawing of a system 100 of an example embodiment. The system comprises a first mobile communication device 110, denoted as MCDt in short; a public land mobile network or PLMN 120 (e.g. a 4G, LTE, or 5G network); an authentication and accounting function 122 AAAplmn; a network slice 124 drawn as part of the PLMN 120; a tenant database DBt 126; and a tenant accounting and authentication function AAAt 128. In sake of simplicity, FIG. 1 shows the network slice 124 entirely on one PLMN 120. In an example embodiment, some parts of the network slice 124 are not under control of the PLMN 120. FIG. 1 further shows a WLAN i.e. IEEE 802.11b compliant access point 121 comprised by the PLMN 120 for WLAN radio access to the PLMN 120 as one portion of a radio interface. In addition, the PLMN 120 normally comprises normal cellular base stations and other equipment not drawn in FIG. 1 in sake of simplicity.

In an example embodiment, the MCDt 110 gains access to the network slice 124 by communicating with the network slice 124 over the PLMN WLAN access point 121 to perform one-tier authentication with the AAAt 128. The MCDt 110 need not have any subscriber identity module that would be suited for normal authentication with the PLMN 120 or through the PLMN 120 with a home PLMN (not shown).

More specifically, in an example embodiment, an S-NSSAI or S-NSSAI-SD is included in messages exchanged between Core Access and Mobility Management Function (AMF) of the PLMN 120—Authentication Server Function (AUSF) of the PLMN—tenant-owned Unified Data Management (T-UDM) or between the AMF—T-AUSF (tenant-owned AUSF)—T-UDM and primary authentication is initiated with, for example, EAP-TLS directly with the tenant (if tenant's subscribers have no USIM credentials) or with one of the mandatory authentication methods (e.g., with 5G AKA or EAP-AKA') (if tenant's subscriber have USIM credentials), while the PLMN 120 provides an infrastructure access for the network slice 124 based on service level agreements with the tenant. In this example embodiment, no primary authentication for infrastructure usage on the PLMN 120 is needed. In one implementation, there is provided a method within the AUSF of a home PLMN of the MCDt to allow routing the MCDt's signaling directly to the T-UDM and to run primary authentication with credentials received from the T-UDM. In another implementation, there is provided a method within the AMF to directly address a tenant's AUSF, T-AUSF, which is connected to the T-UDM. In these aforementioned two implementations, the AMF and/or the AUSF are configured to apply decision methods based on the NSSAI, for example, if a message is routed to the AUSF or T-AUSF. If AUSF, then decision method is needed, whether to route the request to the UDM or to any of the T-UDMs.

Some generic structures are next described before further illustrating various possibilities of some example embodiments.

Figure 2:
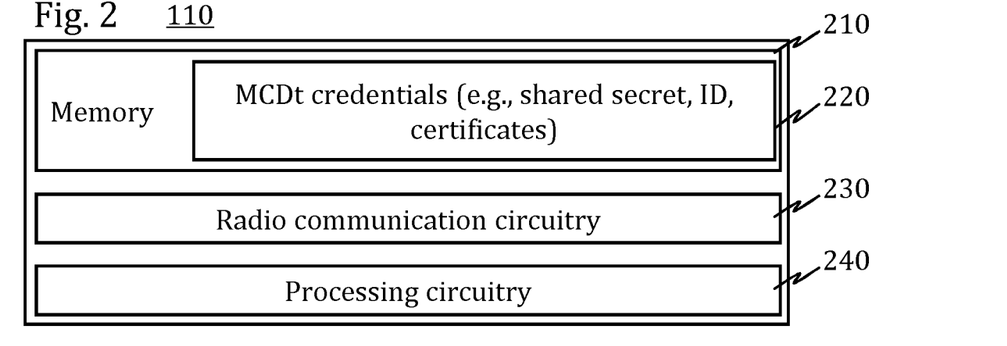
FIG. 2 shows a block diagram of a mobile communication device of a tenant according to an example embodiment.

FIG. 2 shows a block diagram of the MCDt 110; comprising:

a memory 210 comprising MCDt credentials 220 specific to the network slice 124, such as a shared secret known also by the AAAt 128 and device ID and/or one or more certificates;

a radio communication circuitry 230 for wirelessly communication (e.g. with the access point 121); and a processing circuitry 240 (e.g. one or more of processors, logic circuits, and/or application specific integrated circuits) configured to:

detect using the radio communication circuitry an available PLMN (e.g., PLMN 120) that provides access to the network slice 124;

form, based on the MCDt credentials 220, a registration request for one-tier authentication with the network slice 124 independently of any authentication between the MCDt 110 and the PLMN 120; and send, using the radio communication circuitry 230, the registration request to the available PLMN.

Figure 3:
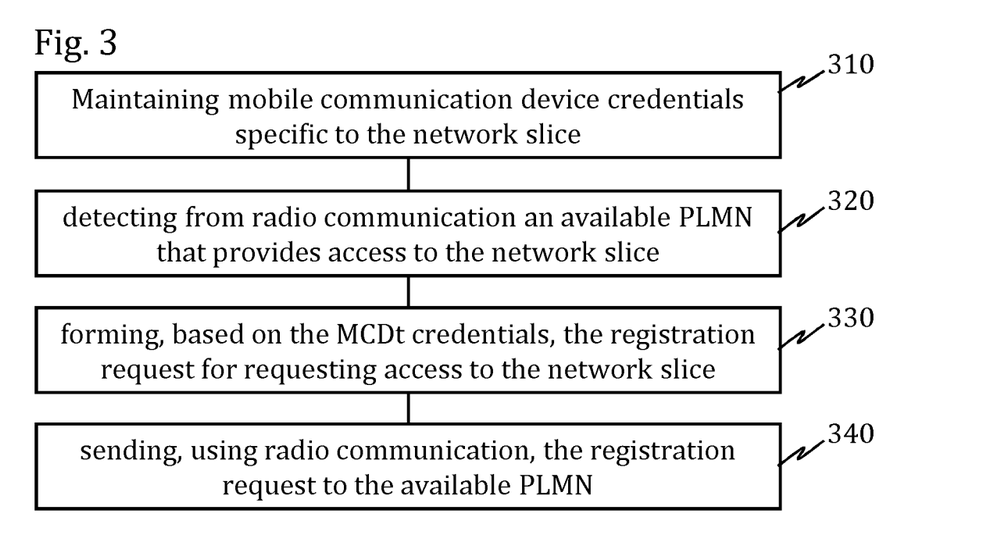
FIG. 3 shows a flow chart of a process in the mobile communication device of FIG. 2 according to an example embodiment.

FIG. 3 shows a flow chart of a process in the MCDt 110 of FIG. 2 according to an example embodiment, comprising:

maintaining 310 mobile communication device credentials specific to the network slice 124;

detecting 320 from radio communication an available PLMN that provides access to the network slice 124 (e.g., by detecting broadcast signals such as an SSID or system information element of the access point 121);

forming 330, based on the MCDt credentials, the registration request for requesting access to the network slice 124; and sending 340, using radio communication, the registration request to the available PLMN.

Figure 4:
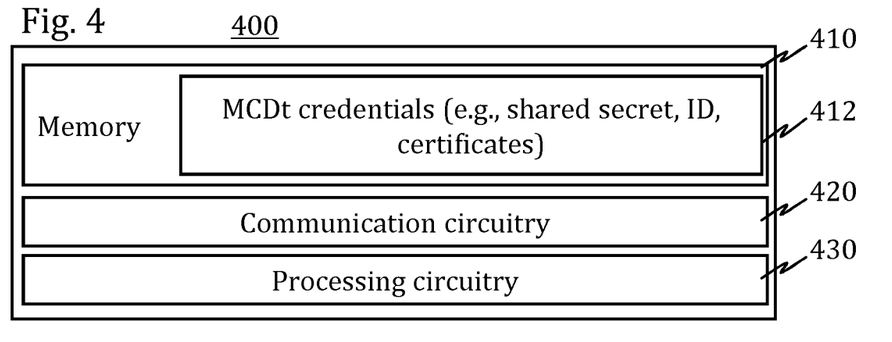
FIG. 4 shows a block diagram of a network element for a public land mobile network according to an example embodiment.

FIG. 4 shows a block diagram of a network element 400 for a PLMN according to an example embodiment, comprising:

a memory 410 comprising program code 412;

a communication circuitry 420 for communication with entities in the PLMN; and a processing circuitry 430 configured to execute the program code 412 and according to the program code 412 to cause:

detecting a registration request from the MCDt 110;

detecting whether the registration request requests access to the network slice 124 with one-tier authentication with the network slice 124, and:

if yes, causing beginning of authenticating the MCDt 110 with the network slice 124 independently of any authentication between the MCDt and the PLMN 120.

Figure 5:
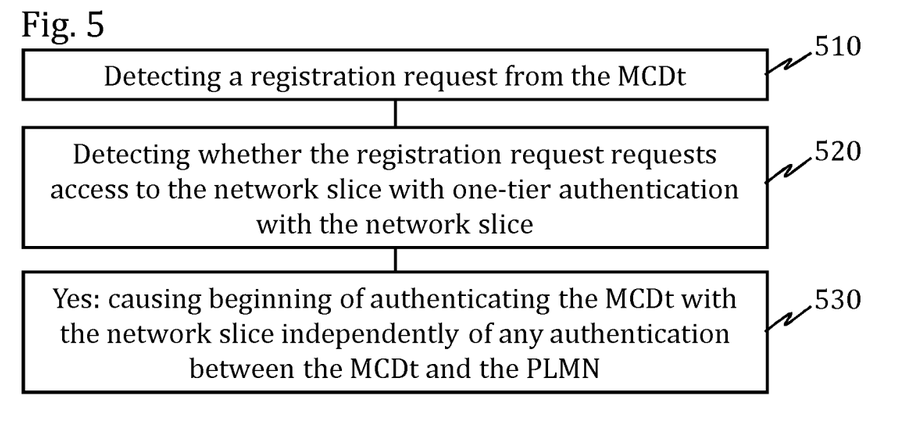
FIG. 5 shows a flow chart of a process in the network element of FIG. 4 according to an example embodiment.

FIG. 5 shows a flow chart of a process in the network element of FIG. 4, comprising:

detecting 510 a registration request from the MCDt 110;

detecting 520 whether the registration request requests access to the network slice 124 with one-tier authentication with the network slice 124, and:

if yes, causing beginning of authenticating the MCDt with the network slice 124 independently of any authentication between the MCDt 110 and the PLMN 120.

By authentication between the MCDt 110 and the PLMN 120, reference is made to authenticating these two entities to each other. The network slice 124 can be implemented using the PLMN 120 so that signaling between the MCDt 110 and the network slice 124 can flow between the MCDt 110 and the PLMN 120 as when authenticating the MCDt with the network slice. However, authentication of the MCDt 110 with the network slice 124 is not governed by the PLMN 120. Instead, in course of successful registration of the MCDt to the network slice 124, any elements of the PLMN 120 not controlled by the network slice 124 are informed of the positive authentication so that access is maintained for the MCDt to the network slice 124.

In an example embodiment, requests can be received by same network elements of the PLMN 120 as in a normal network attach, i.e. not to the network slice 124. Then, the requests should be forwarded as required for normal network attach. Some other requests can be received for accessing the network slice 124. To this end, FIG. 6 shows two high-level architectures representative of two different examples embodiments.

The tenant has provided its users with mobile communication device credentials that comprise or are alternatively formed of: a tenant certificate and a root certificate. A T-UDM comprises the certificates of each MCDt subscribed to the tenant's network slice 124.

Figure 6:
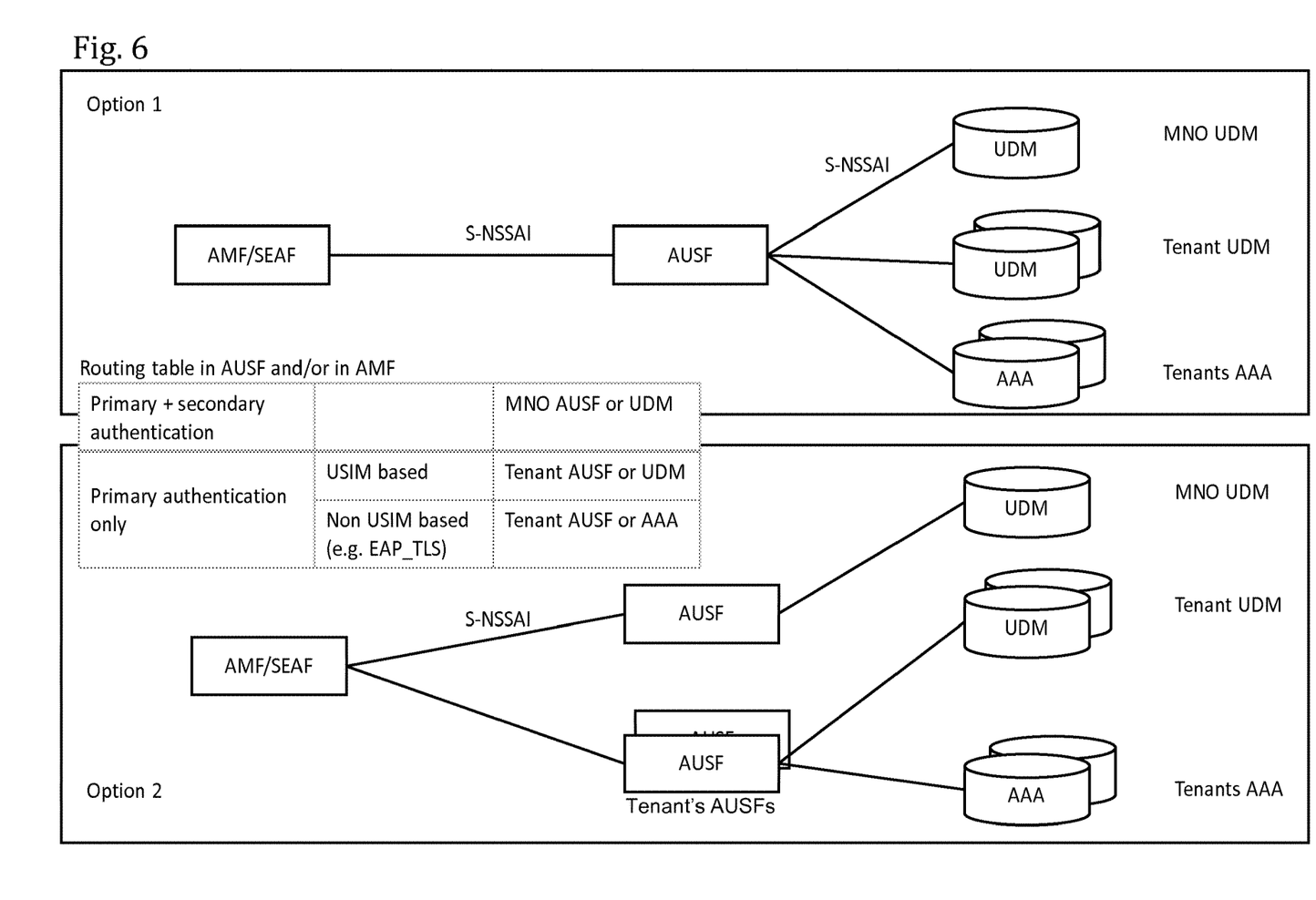
FIG. 6 shows two high-level architectures representative of two different examples embodiments.

In FIG. 6, a multi-tenant database, DB, concept is proposed, using T-UDMs to differentiate from the mobile network operator UDM. In this example case, the vertical tenant exclusively owns the subscriber data (T-UDM). Primary authentication is performed using the T-UDM.

FIG. 6 also shows two different sharing models. In a first model, the AUSF is shared between mobile network operator and tenants, each of them having its own T-UDM. In the second model the AUSF is owned by the tenant, i.e. called T-AUSF.

In both options, the primary authentication is performed by the tenant. The tenant has the possibility of having USIM based or non-USIM based primary authentication configured with its subscribers.

Figure 7:
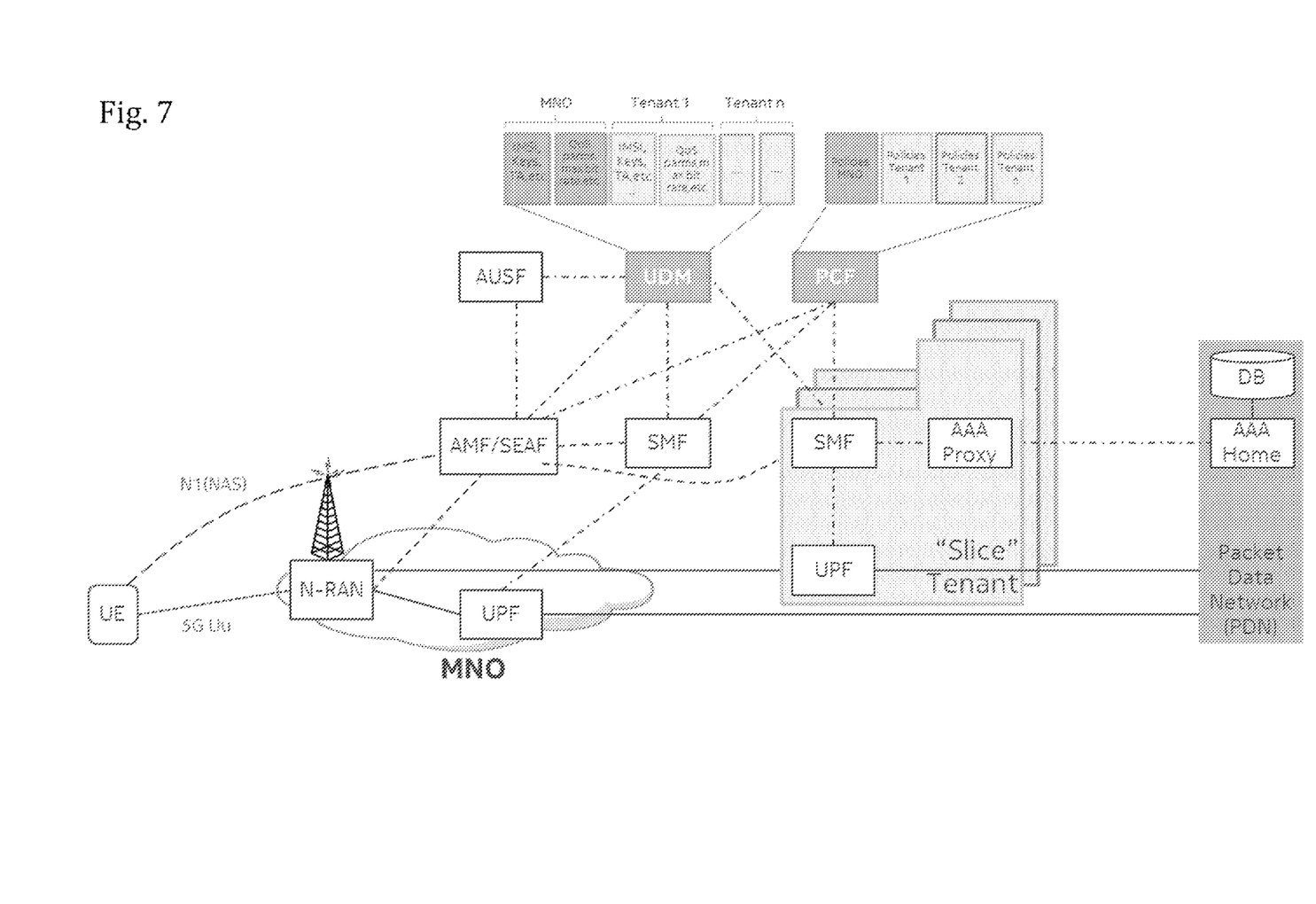
FIG. 7 shows an example on that how a multi-tenant logic can be applied to the Policy Control function PCF.

FIG. 7 shows an example on that how a multi-tenant logic can be applied to the Policy Control function PCF of the PLMN 120.

In some cases, the tenant requires a very isolated network but using shared spectrum, the RAN resources as well as the AMF-AUSF can be dedicated to the tenant's network slice. In this case, even a dedicated T-AMF can be introduced. If instead the isolation is not a strict requirement, the vertical can use a shared RAN, AMF and AUSF. In both cases (or any other intermediate case, e.g. shared RAN but dedicated AMF) the subscriber data can be owned and visible to the tenant only. In order to enable this use case, the following Rel.15 interfaces can be enhanced with the S-NSSAI information or part of it; that is the SD (service Discriminator) that represents the tenant ID:

N12: AMF/SEAF-AUSF (S-NSSAI or S-NSSAI-SD)
N13: AUSF-UDM (S-NSSAI or S-NSSAI-SD)
For policy:

N7-N15: AMF-PCF (S-NSSAI or S-NSSAI-SD)

As used in this document, the term "circuitry" may refer to one or more or all of the following:

(a) hardware-only circuit implementations (such as implementations in only analog and/or digital circuitry) and;

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Without in any way limiting the scope, interpretation, or application of the claims appearing below, a technical effect of one or more of the example embodiments disclosed herein is that a network slice can be made accessible to mobile communication devices without need for subscriber identity modules.

Embodiments of the present invention may be implemented in software, hardware, application logic or a combination of software, hardware and application logic. The software, application logic and/or hardware may reside entirely or in part on a memory of the apparatus MCDt 110 or the network element 400. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. A network element for a public land mobile network, comprising:
 a memory comprising program code; a communication circuitry for communication with entities in the public land mobile network; and
 a processing circuitry configured to execute the program code and according to the program code to cause:
 detect a registration request from a mobile communication device;
 detect whether the registration request requests access to a network slice with one-tier authentication with the network slice, and:
 if yes, cause a beginning of authenticating the mobile communication device with the network slice independently of any authentication between the mobile communication device and the public land mobile network.

2. The network element of claim 1, wherein the registration request is a radio resource control connection setup message.

3. The network element of claim 1, wherein the registration request comprises an indication of a given network slice to which registration is requested.

4. The network element of claim 1, wherein the registration request comprises Network Slice Selection Assistance Information.

5. The network element of claim 4, wherein the Network Slice Selection Assistance Information comprises at least one Single Network Slice Selection Assistance Information, S-NSSAI, the S-NSSAI comprising a Slice/Service Type.

6. The network element of claim 5, wherein the S-NSSAI further comprises a Slice Differentiator that allows differentiating between multiple network slices of the same Service Type.

7. The network element of claim 1, wherein the registration response comprises a registration area indication.

8. A mobile communication device comprising:
 a memory comprising mobile communication device credentials specific to a network slice and a program code;
 a radio communication circuitry for wirelessly communication; and
 a processing circuitry configured to execute the program code and according to the program code to cause:
 detect using the radio communication circuitry an available public land mobile network that provides access to the network slice;
 form, based on the mobile communication device credentials, a registration request for one-tier authentication with the network slice independently of any authentication between the mobile communication device and the public land mobile network; and
 send, using the radio communication circuitry, the registration request to the available public land mobile network.

9. The mobile communication device of claim 8, wherein the radio communication circuitry is configured to perform wireless local area network communications.

10. The mobile communication device of claim 8, wherein the registration request is a radio resource control connection setup message.

11. The mobile communication device of claim 8, wherein the registration request is sent independent of performing any cellular network registration.

12. The mobile communication device of claim 8, wherein the registration request comprises an indication of a given network slice to which registration is requested.

13. The mobile communication device of claim 8, wherein the mobile communication device has no user interface.

14. The mobile communication device of claim 8, wherein the mobile communication device is configured to operate solely under control of one or more machines.

15. The mobile communication device of claim 8, wherein the mobile communication device is configured to receive a registration response from the available public land mobile network.

16. The mobile communication device of claim 15, wherein the registration response comprises information identifying allowed one or more network slices.

17. The mobile communication device of claim 15, wherein the registration response comprises a 5G Globally Unique Temporary Identity.

18. The mobile communication device of claim 15, wherein the registration response comprises a registration area indication.

19. A method in a mobile communication device comprising:
 maintaining mobile communication device credentials specific to a network slice;
 detecting from radio communication an available public land mobile network that provides access to the network slice;
 forming, based on the mobile communication device credentials, a registration request for one-tier authentication with the network slice independently of any authentication between the mobile communication device and the public land mobile network; and
 sending, using radio communication, the registration request to the available public land mobile network.

20. The method of claim 19, wherein the public land mobile network is a 5G public land mobile network.

* * * * *